(12) United States Patent
Choi et al.

(10) Patent No.: US 7,612,128 B2
(45) Date of Patent: Nov. 3, 2009

(54) METHOD FOR PREPARING STYRENE-BUTADIENE LATEX

(75) Inventors: Ho-yeul Choi, Daejeon (KR); Seung-hun Yang, Daejeon (KR); Chang-sun Han, Daejeon (KR)

(73) Assignee: LG Chem, Ltd. (KR)

( * ) Notice: Subject to any disclaimer, the term of this patent is extended or adjusted under 35 U.S.C. 154(b) by 528 days.

(21) Appl. No.: 11/255,468

(22) Filed: Oct. 21, 2005

(65) Prior Publication Data

US 2006/0089454 A1    Apr. 27, 2006

(30) Foreign Application Priority Data

Oct. 21, 2004    (KR) .................. 10-2004-0084423

(51) Int. Cl.
*C08J 3/00* (2006.01)
(52) U.S. Cl. .............. 523/326; 523/328; 523/343; 524/533; 524/534
(58) Field of Classification Search .......... 523/326, 523/328, 343; 524/533, 534
See application file for complete search history.

(56) References Cited

U.S. PATENT DOCUMENTS

| 4,148,842 | A | | 4/1979 | Yu et al. ............... 260/873 |
|---|---|---|---|---|
| 4,529,753 | A | * | 7/1985 | Taylor ................... 523/328 |
| 4,585,808 | A | * | 4/1986 | Reilly .................... 522/116 |
| 4,677,162 | A | | 6/1987 | Grigo et al. ............. 525/67 |
| 5,859,146 | A | | 1/1999 | Kielhorn-Bayer et al. ... 525/399 |
| 6,348,636 | B1 | | 2/2002 | Racz |
| 6,353,087 | B1 | * | 3/2002 | Chang-Mateu et al. ...... 528/481 |
| 6,433,132 | B1 | * | 8/2002 | Wood et al. ............. 528/480 |
| 6,740,691 | B1 | * | 5/2004 | Lorteije et al. .......... 523/328 |
| 7,244,812 | B2 | * | 7/2007 | Muller et al. ............ 528/480 |

FOREIGN PATENT DOCUMENTS

| CN | 1404489 A | | 3/2003 |
|---|---|---|---|
| JP | 58-59258 | | 4/1983 |
| SU | 454743 | * | 11/1975 |

* cited by examiner

*Primary Examiner*—Bernard Lipman
(74) *Attorney, Agent, or Firm*—Cantor Colburn LLP

(57) ABSTRACT

The present invention relates to a method for preparing a styrene-butadiene latex, more particularly to a method for preparing a styrene-butadiene latex comprising the steps of adding a transition boosting agent to a styrene-butadiene copolymer, stirring the mixture and deodorizing the product. Since unreacted residual monomers and volatile organic compounds are reduced significantly, foul smell during drying at high temperature, irritation to skin and eyes and foul smell of the final product can be prevented.

6 Claims, No Drawings

METHOD FOR PREPARING STYRENE-BUTADIENE LATEX

This application claims the benefit of Korean Patent Application No. 10-2004-0084423, filed on Oct. 21, 2004, in the Korean Intellectual Property Office, the disclosure of which is incorporated herein by reference.

TECHNICAL FIELD

The present invention relates to a method for preparing a styrene-butadiene latex, more particularly to a method for preparing a styrene-butadiene latex with no foul smell during drying at high temperature, no irritation to skin and eyes and no foul smell in the final product by significantly reducing residual monomers and volatile organic compounds.

BACKGROUND ART

In general, a styrene-butadiene latex is prepared by copolymerization. Typically, the final yield is 95% or above. Residual monomers and volatile organic compounds (VOC's) are removed from such prepared latex through a deodorization process, which is conventionally performed with steam.

Despite the deodorization process, it is impossible to completely remove the residual monomers and volatile organic compounds. When the materials are present in the latex in large amount, it smells bad when the latex is dried at high temperature and, in severe cases, skin and eye irritation may occur. The residual monomers and volatile organic compounds also cause foul smell of the final product.

Up to now, extension of the deodorization process has been carried out in order to reduce the residual monomers and volatile organic compounds. But, this method is limited in reducing the residual monomers and volatile organic compounds and increases the production time, thereby lowering productivity.

DISCLOSURE OF INVENTION

It is an object of the present invention to provide a method for preparing a styrene-butadiene latex with no foul smell during drying at high temperature, no irritation to skin and eyes and no foul smell in the final product by significantly reducing the residual monomers and volatile organic compounds.

It is another object of the invention to provide a paper coating composition with no foul smell and no irritation to skin and eyes and a paper treated with the same.

To attain the objects, the present invention provides a method for preparing a styrene-butadiene latex comprising the step of adding a transition boosting agent to a styrene-butadiene copolymer, stirring the mixture and deodorizing the product.

The invention also provides a paper coating composition comprising such prepared styrene-butadiene latex.

The invention further provides a paper coated with the coating composition.

Hereunder is given a detailed description of the present invention.

The present inventors found that residual monomers and volatile organic compounds can be significantly reduced from a latex when a transition boosting agent is added to a styrene-butadiene copolymer, because polymerization degree of the unreacted monomers and volatile organic compounds are increased.

The styrene-butadiene latex of the present invention is prepared by adding a transition boosting agent to a styrene-butadiene copolymer, stirring the mixture and deodorizing the product.

The styrene-butadiene copolymer used in the invention can be prepared by a conventional method.

Specifically, the styrene-butadiene copolymer can be prepared by polymerizing a styrene monomer, a butadiene monomer, an ethylenic unsaturated acid monomer, a vinyl cyanide monomer and a monomer copolymerizable with the afore-mentioned monomers in the presence of a chain transfer agent. More specifically, it may be prepared by polymerizing 20-90 parts by weight of a styrene monomer, 10-70 parts by weight of a butadiene monomer, 1-18 parts by weight of an ethylenic unsaturated acid monomer, 0.5-15 parts by weight of a vinyl cyanide monomer and 1-25 parts by weight of a monomer copolymerizable with the afore-mentioned monomers. Or, it can be prepared by polymerizing each monomer to form a seed, grafting the monomer in the seed to form a core and grafting the monomer in the core to form a shell.

The styrene monomer offers adequate hardness and water repellency to the prepared copolymer. Any conventional styrene monomer used to prepare a styrene-butadiene copolymer can be used.

Preferably, the styrene monomer is comprised in 20-90 parts by weight per 100 parts by weight of the total monomers. If the content is below 20 parts by weight, hardness and water repellency may be insufficient. Otherwise, if it exceeds 90 parts by weight, adhesion force and film forming ability may worsen.

The butadiene monomer offers flexibility to the prepared copolymer. Any conventional butadiene monomer used to prepare a styrene-butadiene copolymer can be used. Preferably, 1,3-butadiene is used.

Preferably, the butadiene monomer is comprised in 10-70 parts by weight per 100 parts by weight of the total monomers. If the content is below 10 parts by weight, the prepared copolymer becomes too hard. Otherwise, if it exceeds 70 parts by weight, rigidity decreases significantly.

The ethylenic unsaturated acid monomer enhances adhesion force of the prepared copolymer and improves stability of the copolymer particles.

For the ethylenic unsaturated acid monomer, an unsaturated carboxylic acid or an unsaturated polycarboxylic acid alkyl ester having at least one carboxylic acid group may be used. Particularly, the unsaturated carboxylic acid may be methacrylic acid, acrylic acid, itaconic acid, crotonic acid, fumaric acid, maleic acid, etc. And, the unsaturated polycarboxylic acid alkyl ester may be itaconic acid monoethyl ester, fumaric acid monobutyl ester, maleic acid monobutyl ester, etc.

Preferably, the ethylenic unsaturated acid monomer is comprised in 1-18 parts by weight per 100 parts by weight of the total monomers. If the content is below 1 part by weight, improvement of adhesion force and particle stability cannot be expected. Otherwise, if it exceeds 18 parts by weight, polymerization stability, etc. may be not good.

The vinyl cyanide monomer improves print gloss.

For the vinyl cyanide monomer, acrylonitrile or methacrylonitrile may be used. Preferably, it is comprised in 0.5-15 parts by weight per 100 parts by weight of the total monomers.

The monomer copolymerizable with the afore-mentioned monomers offers adequate hardness to the prepared latex and improves film forming ability.

For the copolymerizable monomer, methyl acrylate, etc. may be used. Preferably, it is comprised in 1-25 parts by weight per 100 parts by weight of the total monomers.

The chain transfer agent is used to adjust molecular weight, gel content and gel structure of the styrene-butadiene copolymer. Preferably, it is comprised in 0.1-5 parts by weight per 100 parts by weight of the total monomers.

Further, such common additives as a polymerization initiator, an emulsifier, an electrolyte, etc. may be added when preparing the styrene-butadiene copolymer.

When the transition ratio to the styrene-butadiene copolymer reaches 80-99%, a transition boosting agent is added and the mixture is stirred.

The transition boosting agent increases degree of polymerization of the unreacted monomers and volatile organic compounds present in the styrene-butadiene copolymer, and thus reduces contents of the residual monomers and volatile organic compounds.

For the transition boosting agent, a compound copolymer with the styrene-butadiene copolymer can be used. Particularly, an unsaturated carboxylic acid alkyl ester such as methyl acrylate, methyl methacrylate, ethyl acrylate, ethyl methacrylate, butyl acrylate, butyl methacrylate, etc.; an unsaturated carboxylic acid hydroxyalkyl ester such as β-hydroxyethyl acrylate, β-hydroxypropyl acrylate, β-hydroxyethyl methacrylate, etc.; an unsaturated carboxylic acid amide such as acrylamide, methacrylamide, itaconamide, maleic acid monoamide, etc. and derivatives thereof; or an aromatic vinyl monomer such as α-methylstyrene, vinyltoluene, p-methylstyrene, etc. are preferable.

Preferably, the transition boosting agent is comprised in 0.1-20 parts by weight per 100 parts by weight of the styrene-butadiene copolymer. Within this range, reduction of the residual monomers and volatile organic compounds is more effective.

In addition, such polymerization initiator as potassium persulfate may be added when adding the transition boosting agent. Preferably, it is comprised in 0.1-1 part by weight.

After the residual monomers and volatile organic compounds are removed, the styrene-butadiene copolymer is deodorized as is done in the conventional method for preparing a styrene-butadiene latex.

The present invention also provides a paper coating composition comprising the styrene-butadiene latex and a paper coated with the composition. The coating composition and the paper do not give off foul smell during drying at high temperature and cause no skin or eye irritation. Thus, processing thereof is convenient and the final product does not have foul smell.

BEST MODE FOR CARRYING OUT THE INVENTION

Hereinafter, the present invention is described further in detail through examples. However, the following examples are only for the understanding of the invention and the invention is not limited to or by the following examples.

EXAMPLES

Example 1

Air inside a 10 L pressurized reactor equipped with an stirrer, a thermometer, a cooler and a nitrogen gas inlet, which is capable of feeding a monomer, an emulsifier and a polymerization initiator continuously, was replaced with nitrogen. After feeding 5 parts by weight of a styrene-butadiene seed, 33 parts by weight of butadiene, 49 parts by weight of styrene, 8 parts by weight of methyl methacrylate, 5 parts by weight of acrylonitrile, 5 parts by weight of itaconic acid, 3 parts by weight of sodium dodecyldibenzensulfonate, 0.3 part by weight of t-dodecylmercaptan, 0.4 part by weight of sodium bicarbonate and 420 parts by weight of ion exchange water, the reactor was heated to 80° C. 0.8 part by weight of potassium persulfate, a polymerization initiator, was added and polymerization was performed for about 300 minutes while stirring. The transition ratio of the copolymer was 91%.

To the prepared copolymer were added 10 parts by weight of methyl acrylate, a transition boosting agent, and 0.2 part by weight of potassium persulfate, a polymerization initiator. After heating to 90° C., the mixture was stirred for 360 minutes.

After stirring, deodorization was performed for 360 minutes to obtain a styrene-butadiene latex.

Examples 2-10

The procedure of Example 1 was repeated, except for using transition boosting agents given in Table 1 below.

TABLE 1

| | Classification | Examples | | | | | | | | | |
|---|---|---|---|---|---|---|---|---|---|---|---|
| | | 1 | 2 | 3 | 4 | 5 | 6 | 7 | 8 | 9 | 10 |
| Transition boosting agent | Methyl acrylate | 10 | 5 | — | — | — | — | — | — | — | — |
| | Methyl methacrylate | — | — | 10 | — | — | — | — | — | — | — |
| | Ethyl methacrylate | — | — | — | 10 | — | — | — | — | — | — |
| | β-Hydroxyethyl acrylate | — | — | — | — | 10 | 5 | — | — | — | — |
| | β-Hydroxyethyl methacrylate | — | — | — | — | — | — | 10 | — | — | — |
| | Acrylamide | — | — | — | — | — | — | — | 10 | — | — |
| | Methacrylamide | — | — | — | — | — | — | — | — | 10 | — |
| | α-Methylstyrene | — | — | — | — | — | — | — | — | — | 10 |

Examples 11-12

The procedure of Example 1 was repeated, except for changing transition ratio and stirring time when preparing the copolymer as in Table 2 below.

TABLE 2

| Classification | Example 1 | Example 11 | Example 12 |
|---|---|---|---|
| Transition ratio | 91% | 84% | 95% |
| Stirring time(min) | 300 | 240 | 360 |

Comparative Example 1

The procedure of Example 1 was repeated, except for not using a transition boosting agent.

Comparative Example 2~3

The procedure of Example 1 was repeated, except for changing stirring time after adding the polymerization initiator and deodorization as in Table 3 below.

TABLE 3

| Classification | Comparative Example 1 | Comparative Example 11 | Comparative Example 12 |
|---|---|---|---|
| Stirring time after adding polymerization initiator | 360 minutes | 540 minutes | 360 minutes |
| Deodorization time | 360 minutes | 360 minutes | 540 minutes |

Contents of residual monomers and volatile organic compounds in the styrene-butadiene latexes prepared in Examples 1-12 and Comparative Examples 1-3 were determined with Headspace GC. The result is given in Table 4 below.

TABLE 4

| | Examples | | | | | | | | | | | | Comparative Examples | | |
|---|---|---|---|---|---|---|---|---|---|---|---|---|---|---|---|
| Classification | 1 | 2 | 3 | 4 | 5 | 6 | 7 | 8 | 9 | 10 | 11 | 12 | 1 | 2 | 3 |
| VOC | 126 | 206 | 112 | 140 | 152 | 277 | 131 | 330 | 233 | 264 | 346 | 91 | 675 | 517 | 339 |
| 4-VCH | 1 | 4 | 1 | — | 9 | 7 | 5 | 10 | 5 | 3 | 5 | 3 | 7 | 5 | 4 |
| Toluene | — | — | — | — | — | — | — | — | — | — | — | — | 1 | 1 | — |
| Styrene | 67 | 137 | 32 | 84 | 22 | 183 | 68 | 248 | 156 | 177 | 251 | 57 | 612 | 465 | 333 |
| Butadiene | 58 | 67 | 79 | 56 | 78 | 87 | 56 | 72 | 64 | 74 | 82 | 21 | 55 | 46 | 2 |

[Note]
VOC: Volatile organic compounds
4-VCH: 4-Vinylcyclohexene

As seen in Table 4, when transition boosting agents were used according to the present invention (Examples 1-12), contents of residual monomers and volatile organic compounds were significantly lower than those for Comparative Examples 1-3. When deodorization time was increased (Comparative Example 3), contents of residual monomers and volatile organic compounds could be reduced, but not so much as in Examples 1-12.

INDUSTRIAL APPLICABILITY

The present invention is advantageous in significantly reducing residual monomers and volatile organic compounds, thereby preventing foul smell during drying at high temperature, irritation to skin and eyes and foul smell in the final product.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A method for preparing a styrene-butadiene latex comprising the steps of adding a transition boosting agent to a styrene-butadiene copolymer, stirring the mixture and deodorizing the product, the transition boosting agent being at least one selected from a group consisting of methyl acrylate, methyl methacrylate, ethyl acrylate, ethyl methacrylate, butyl acrylate, butyl methacrylate, β-hydroxyethyl acrylate, β-hydroxypropyl acrylate, β-hydroxyethyl methacrylate, acrylamide, methacrylamide, itaconamide, maleic acid monoamide, α-methylstyrene, vinyltoluene and p-methylstyrene.

2. The method of claim 1, the styrene-butadiene copolymer being prepared by polymerizing a styrene monomer, a butadiene monomer, an ethylenic unsaturated acid monomer, a vinyl cyanide monomer and a monomer copolymerizable with the afore-mentioned monomers in the presence of a chain transfer agent.

3. The method of claim 1, the transition boosting agent being added when the transition ratio of the styrene-butadiene copolymer is 80-99%.

4. The method of claim 1, the transition boosting agent being comprised in 0.1-20 parts by weight per 100 parts by weight of the styrene-butadiene copolymer.

5. A paper coating composition comprising a styrene-butadiene latex prepared by the method of claim 1.

6. A paper coated with the coating composition of claim 5.

* * * * *